United States Patent [19]

Harmony et al.

[11] Patent Number: 4,954,678
[45] Date of Patent: Sep. 4, 1990

[54] ANNULAR RF SEALER AND METHOD

[75] Inventors: Daniel C. Harmony; John B. Gummere; Stephen C. Minney, all of Tucson, Ariz.

[73] Assignee: Engineering & Research Associates, Inc., Tucson, Ariz.

[21] Appl. No.: 202,317

[22] Filed: Jun. 6, 1988

[51] Int. Cl.$^5$ .............................................. H05B 6/54
[52] U.S. Cl. .............................. 219/10.43; 219/10.53; 219/10.73; 219/10.81; 156/274.4; 156/273.7; 156/380.6
[58] Field of Search ................... 219/10.81, 10.53, 9.5, 219/105.7, 10.41, 10.43, 10.67, 10.73; 156/272.2, 273.3, 273.7, 274.4, 379.6, 380.2, 380.6; 604/96, 264, 280

[56]  References Cited

U.S. PATENT DOCUMENTS

| | | | |
|---|---|---|---|
| 3,322,590 | 5/1967 | Clark | 219/10.53 X |
| 4,186,292 | 1/1980 | Acker | 219/10.81 |
| 4,390,832 | 6/1983 | Taylor | 219/10.81 X |
| 4,490,598 | 12/1984 | Minney et al. | 219/10.81 |
| 4,574,173 | 3/1986 | Bennett | 219/10.81 X |
| 4,628,168 | 12/1986 | Nebergall et al. | 219/10.81 |
| 4,755,649 | 7/1988 | Barker et al. | 219/10.81 |

Primary Examiner—Philip H. Leung
Attorney, Agent, or Firm—Cahill, Sutton & Thomas

[57]  ABSTRACT

A radially compressible heating element is located about concentric overlapped heat fusible elements temporarily mounted upon a mandrel to form an annular seal between the heat fusible elements upon energization of the heating element.

13 Claims, 4 Drawing Sheets

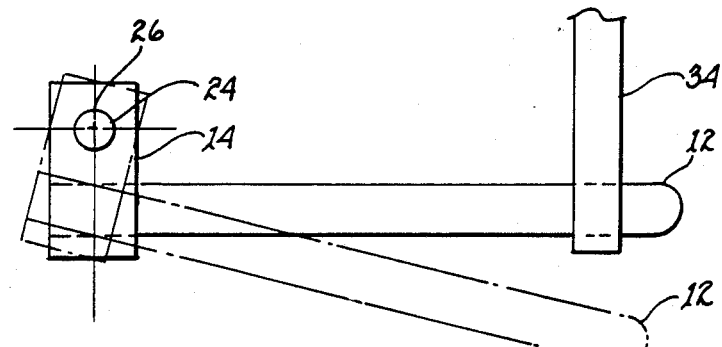
fig. 4
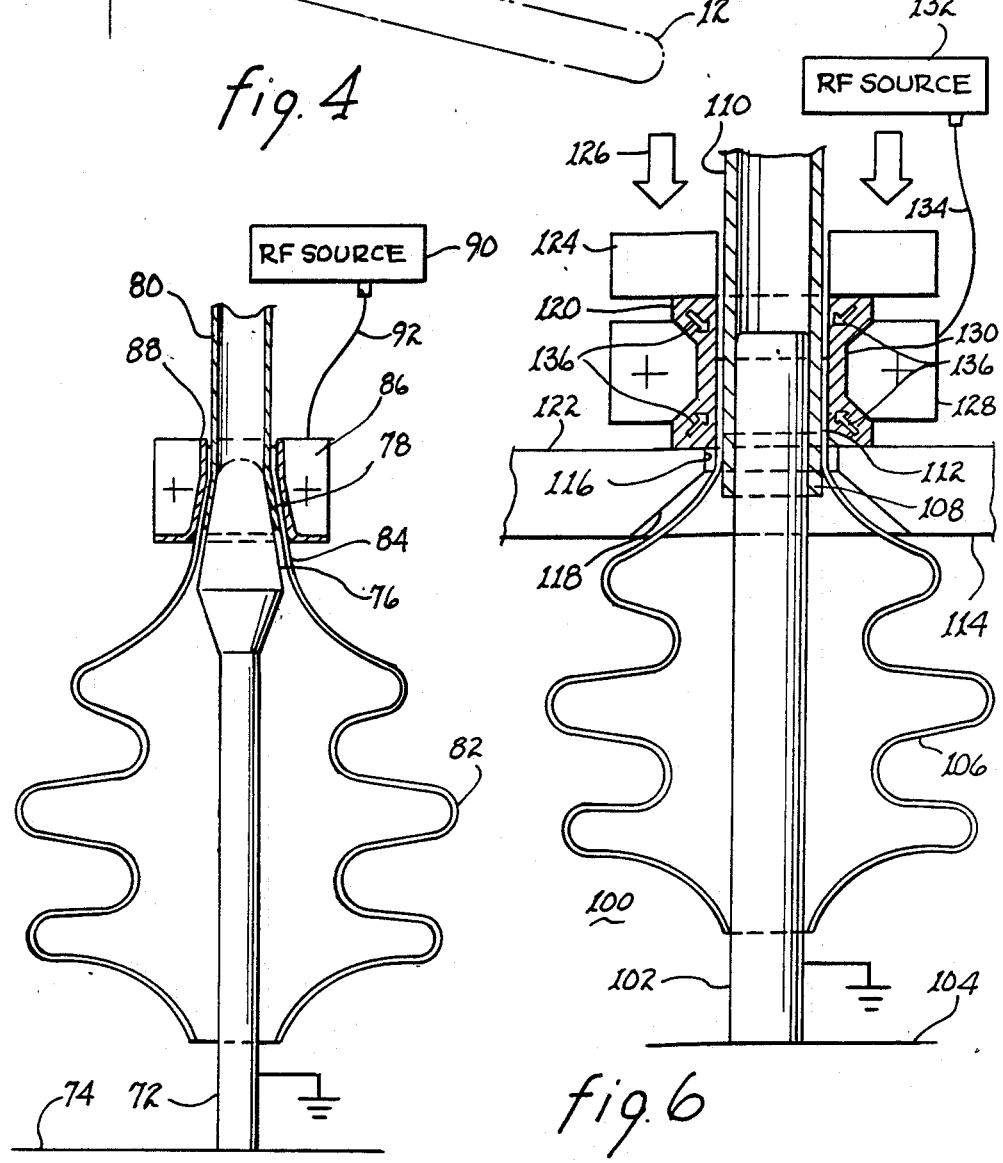
fig. 5
fig. 6

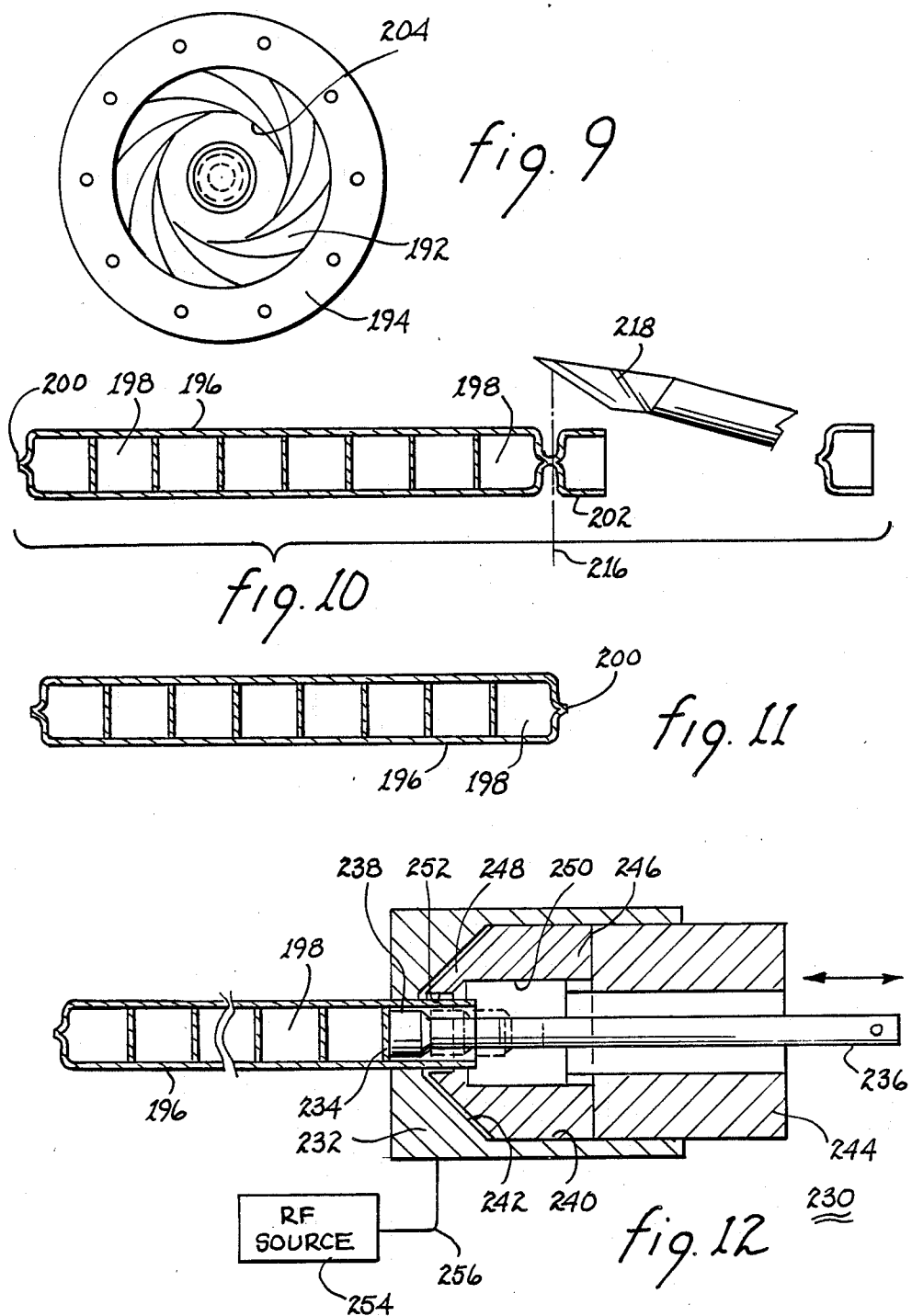

ANNULAR RF SEALER AND METHOD

BACKGROUND OF THE INVENTION

1. Field of the invention.

The present invention relates to RF sealers and, more particularly, to annular sealing devices.

2. Description of the prior art.

Heat weldable plastics have been commercially available for many years. Such plastics are generally welded to one another by applying a heater or heated element to the plastic with simultaneous compression against a base or anvil. By correctly guaging the proper combination of compressive force and heat applied, a weld can be made which will not melt the plastic sufficiently to affect its integrity nor preclude a proper weld from being formed. Because traditional heating elements tend to heat slowly and radiate heat during periods of use and nonuse as power is consumed to maintain the heating element at a predetermined temperature during periods of nonuse, alternative devices for forming the welds are preferable. The transmission of a burst of radio frequency (RF) energy across a junction of certain heat weldable plastic materials with the proper dielectric characteristics will heat such materials to a temperature sufficient to develop a weld therebetween. By combining a compressive or retaining force to the plastic junction at the time the RF energy is transmitted thereacross, a localized, well defined and high integrity weld can be made.

In the field of blood collection, tubes extending from and in fluid communication with filled blood collection bags must be sealed after fill of the bag. Such sealing can be effected in a number of ways U.S. Pat. No. 4,013,860, which patent is assigned to the present assignee, describes and illustrates a hand-held sealer for making welds across a length of plastic tubing. The sealer includes fixed and moveable jaws and a circuit for transmitting a particularly timed and configured pulse of RF energy across the moveable jaws after they have compressed to a predetermined extent the tubing to be sealed. The mechanical configuration, circuit and operation there of described and illustrated in this patent is incorporated herein by reference. U.S. Pat. No. 4,186,292, which patent is assigned to the present assignee, describes and illustrates a stationary sealer for sealing plastic tubing. Upon actuation of the sealer, the tubing is compressed whereafter a predetermined burst of RF energy is applied across the tubing to create a weld thereacross. The disclosure contained in this patent is incorporated herein by reference. U.S. Pat. No. 4,490,598, assigned to the present assignee, is directed to a particularly configured head for forming a weld across a length of plastic tubing in response to application of a compressive force and a burst of RF energy. The teachings contained therein are incorporated by reference in the present disclosure. U.S. Pat. No. 4,390,832, is directed to a circuit for providing a source of RF energy to be applied across a pair of jaws, or electrodes, to form a weld in weldable plastic material placed therebetween. In addition, numerous differently configured jaws for compressing or retaining the weldable plastic material placed therebetween and for focusing the applied burst of RF energy are disclosed. The teachings contained in this patent are incorporated herein by reference.

It is believed that the above referenced United States patents describe the state of the art in using RF energy to form welds across fluid filled or unfilled weldable plastic tubing. It is appreciated that various other types of welding apparatus using non RF heaters are known and used for the purpose of sealing packages, forming elongated welds in sheets of plastic and the like. However, such prior art is neither pertinent to or demonstrative of devices for meeting and resolving unique problems attendant the formation of seals in filled or unfilled weldable plastic tubing in response to a burst of RF energy.

To the knowledge of the present inventors, there are no devices commercially available nor any teachings for construction of a device which is capable of forming an annular weld between two concentric overlapping segments of weldable plastic by application of RF energy.

SUMMARY OF THE INVENTION

A pair of lengths of concentric plastic tubing, of which at least one is responsive to dielectric welding, are placed in overlapping relationship to one another at the point about which an annular weld is to be made. A mandrel of electrically conductive material serving as a first electrode is placed in circumscribed relationship with the overlapped concentric elements. A second electrode of electrically conductive material is placed in circumscribing relationship to the overlapped segments of the concentric elements. The second electrode is configured to retain the overlapped segments in contact with one another and a compressive force may be exerted thereby about the overlapped segments. A source of RF energy is electrically connected to the first and second electrodes. Upon actuation, the source of RF energy transmits a burst of RF energy across the first and second electrodes and melts the overlapped segments to effect an annular weld between the two concentric elements. Thereafter, the second electrode is removed and the mandrel is withdrawn. By careful control of the degree of compressive force and of both the energy level and duration of the RF pulse, a high integrity seal is developed which seal forms a smooth transitional external surface between the larger and smaller tubings and does not create an obstruction within or reduction of the internal diameter of the tubing.

It is therefore a primary object of the present invention to provide an RF sealer for annularly welding two concentric overlapping segments of material at least one of which is responsive to dielectric welding.

Another object of the present invention is to provide a sealer for making an annular weld by application of a pulse of RF energy.

Yet another object of the present invention is to provide a sealer for retaining in place concentric overlapped elements to be welded upon application of a pulse of RF energy.

Still another object of the present invention is to provide a pair of electrodes for transmitting RF energy radially across a pair of concentric heat weldable elements.

Still another object of the present invention is to provide a sealer for annularly welding overlapped concentric elements without obstructing or reducing in diameter the smaller diameter element.

Still another object of the present invention is to provide a sealer for annularly welding overlapped concentric elements to produce a smooth external surface transition between the two elements.

A further object of the present invention is to provide a mandrel serving as a first electrode for supporting a pair of overlapped concentric elements thereon, a concentric ring serving as a second electrode extending about the elements and a source of RF energy to apply a burst of RF energy between the first and second electrodes to develop an annular weld between overlapped portions of the elements.

A still further object of the present invention is to provide a method for making an annular weld between two concentric overlapped heat weldable elements at least one of which is responsive to dielectric welding.

A yet further object of the present invention is to provide a method for using a burst of RF energy to form an annular weld between two overlapped elements.

A yet further object of the present invention is to provide a method for annularly welding two concentric elements without reducing in diameter the circumscribed element.

A yet further object of the present invention is to provide a method for annularly welding two concentric elements and to form a smooth transition of the external surface between the circumscribing and circumscribed elements.

These and other objects of the present invention will become apparent to those skilled in the art as the description thereof proceeds.

DESCRIPTION OF THE DRAWINGS

The present invention will be described with greater specificity and clarity with reference to the following figures, in which:

FIG. 4 is a top view illustrating loading of the sealer;

FIG. 5 illustrates a first variant of the sealer;

FIG. 6 illustrates a second variant of the sealer;

FIG. 9 illustrates an electrode used with the encapsulating sealer shown in FIG. 8;

FIG. 10 illustrates segregation of the encapsulated items from the remaining length of tubing;

FIG. 11 illustrates the finished form of the encapsulated items; and

FIG. 12 illustrates a variant of the sealer shown in FIG. 8.

DESCRIPTION OF THE PREFERRED EMBODIMENT

In various applications and particularly in the medical field, it is useful to attach a length of tubing of one diameter with a concentrically located tubing of a larger diameter through a circumferential or annular weld therebetween. In the medical field, a balloon (which is a thin walled tubing of enlarged diameter) attached to a catheter (a length of tubing) is useful in performing various diagnostic and treatment procedures. In certain applications, the catheter extends through opposed ends of the balloon and the balloon serves primarily in the manner of a positioning device to secure the catheter within a passageway, tube, vein or artery; the balloon may also be expanded for therapeutic purposes. In certain applications, a plurality of catheters may be associated with one balloon or a plurality of balloons may be associated with one or more catheters. To insure against any impediment to the flow of fluid within the tubing or balloon at the location of the annular weld, there should be no obstruction formed at the interior wall and the interior diameter should not be reduced. To prevent trauma to a patient, there should be no step or discontinuity of the external surface attendant the weld; instead, there should be a smooth transition of any change in outside diameter proximate the annular weld.

Figure 1:
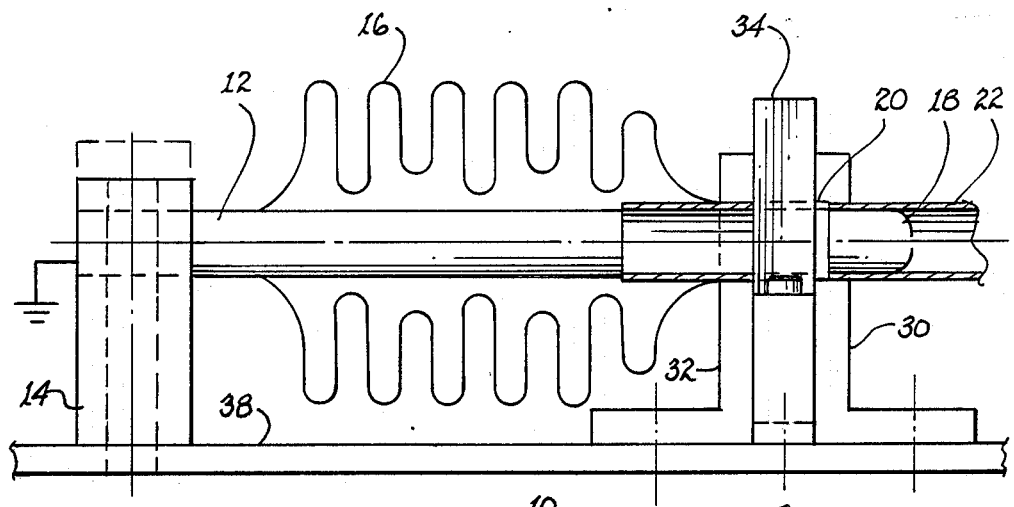
FIG. 1 is a partial cross sectional view of an RF sealer.

Referring to FIG. 1, there is illustrated a side view of an annular sealer 10. The sealer includes a mandrel 12 pivotally mounted upon a post 14, which post permits pivotal movement in the horizontal axis and displacement in the vertical axis. A balloon 16 is threaded from end 18 of the mandrel onto and for support by the mandrel. As illustrated, the balloon may be wadded or compressed, depending upon the relative lengths of the mandrel and the balloon. Preferably, the mandrel is of a diameter somewhat less than that of sleeve section 20 to accommodate unrestricted passage of the balloon onto and off of the mandrel. A length of tubing 22 to be welded to sleeve section 20 is slipped onto the mandrel and circumscribed by the sleeve section, as illustrated. The degree of overlap between the tubing and the sleeve section is a function of the use to be served by the finished device.

Figure 2:
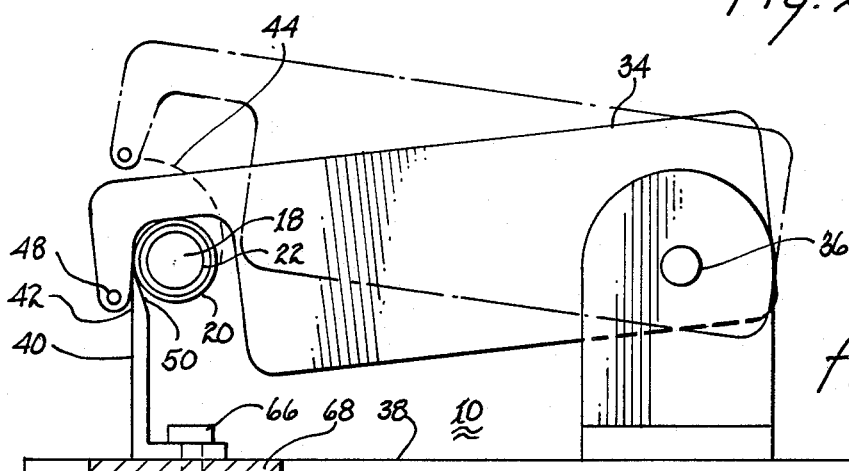
FIGS. 2, 3 and 3a illustrate circumscribing electrode of the sealer.
Figures 3, 3A:
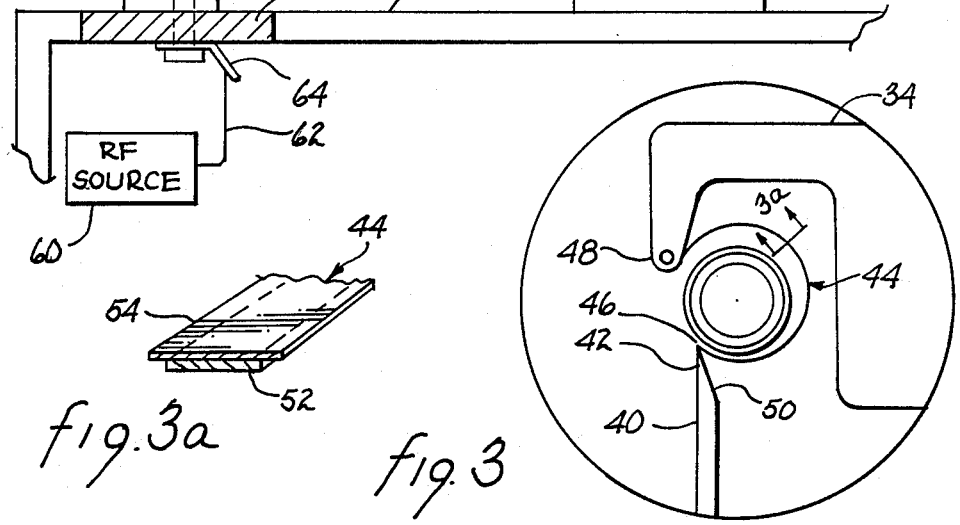

A pair of supports 30, 32 pivotally support arm 34 through a pivot 36, as shown in FIGS. 1 and 2. These supports may be mounted upon a base 38. An anchor 40 is attached to and extends upwardly from the base. The anchor includes a tapered end 42. One end of a band 44, as shown in further detail in FIGS. 3 and 3a, is attached to tip 46 of the tapered end and extends downwardly along surface 50. The other end of the band is secured to extremity 48 of arm 34. As detailed in FIG. 3a, band 44 includes two elements. A ribbon 52 of beryllium copper or other electrically conductive material is secured to a thin flexible strip 54 of high temperature insulating plastic film; such a film may be of the type known as polyimide film sold by the DuPont Company under the trademark Kapton. Preferably, the insulating strip is approximately 30% wider than ribbon 52

Referring to FIG. 4, there is shown a top view of mandrel 12 illustrated in FIG. 1. Post 14 includes pivot means 24 which is capable of accommodating limited pivotal and vertical movement of the post about a stanchion 26 or the like. Pivotal movement of the post and the attached mandrel is illustrated by the dashed line in FIG. 4 and vertical movement of the post and attached mandrel is illustrated by the dashed lines of FIG. 1. Referring to FIG. 2, it is to be noted that arm 34 is capable of pivotal movement in the vertical axis, as depicted by the dashed outline of the arm.

In operation, a balloon 16 is slipped onto mandrel 12, as illustrated in FIG. 1. A length of tubing 22 is also slipped onto the mandrel concentric with but interior of sleeve section 20 of the balloon. The resulting positioning overlaps the tubing with the sleeve section proximate arm 34. The loading of the mandrel may be performed by an operator when mandrel is in the first state, as depicted by the dashed outline of mandrel 12 shown in FIG. 4. To locate the loaded mandrel in its position, as shown in FIG. 2, post 14 is pivoted about stanchion 26 to bring the mandrel into close proximity with anchor 40 (see FIG. 2). Thereafter, the post is raised to permit the mandrel to clear tip 46 of the anchor. To position the mandrel in its second state, the post is lowered. When the mandrel is in its second state, the balloon and tubing mounted thereon are adjacent surface 50 of tapered end 42 and at least partially in contact with that portion of band 44 extending from extremity 48. It is to be understood that on positioning mandrel 12 from its first to its second state, arm 34 is in the raised position, as depicted by the dashed lines in FIG. 2.

After the mandrel has bee n placed in its second state, arm 34 is lowered by pivoting it about pivot point 36 from its first state to its second state. It may be noted that FIG. 3 depicts the position of arm 34 just prior to lowering the arm to its second state. In the second state of arm 34, band 44 is drawn about the mandrel, the balloon and tubing mounted thereon and in overlapping relationship with tip 46. Thereby, band 44 essentially circumscribes the balloon and tubing mounted upon the mandrel. Preferably, the contour of surface 50 on tapered end 42 is concave in conformance with the cylindrical surface presented by the balloon and tubing.

A source 60 of RF energy is connected via conductor 62 with terminal 64. The terminal is in electrical contact with anchor 40 via a bolt 66, or the like. The bolt, anchor and terminal are electrically insulated from base 38 by means of a dielectric insulator 68, or the like, secured to the base. The anchor is in electrical contact with ribbon 52 of band 44. The ribbon is electrically isolated from base 38. The source of RF energy may be any one of the circuits described in the above identified U.S. patents assigned to the present assignee.

After loaded mandrel 12 has been placed in its second state and arm 34 has been lowered to encircle the loaded mandrel with band 44, the source of RF energy is energized. The resulting radiation between ribbon 52 of band 44 and mandrel 12 will cause heating of the circumscribed parts of the balloon and tubing. By careful control of both the power level and duration of the pulse generated by the source of RF energy, slight melting of both the balloon and tubing will result. Such melting will fuse these two elements together to form an annular weld. After a predetermined time, the source of RF energy is deactivated and the melted plastic is permitted to cool to develop the weld. The extension of strip 54 on either side of ribbon 52 will serve in the manner of a mechanical buffer to permit flow of the melted plastic laterally. The resulting annular weld smoothly transitions laterally from the center of the weld. The amount or centripetal force exerted by band 44 through downward movement of arm 34 must be carefully controlled as a function of the thickness of the balloon and tubing to be welded commensurate with the power level and duration of the RF radiation.

Upon completion of the weld, arm 34 is raised to release the loaded mandrel. Post 14 is raised to permit the loaded mandrel to clear anchor 40; thereafter it is rotated to the position illustrated by dashed lines in FIG. 4. The balloon and tubing, being of a loose fit upon a mandrel, may now be slid off the mandrel.

The mandrel in combination with band 44 function in the manner of a capacitor to absorb the output power of the source of RF energy. Necessarily, there must be impedance matching for efficiency and control purposes. It has been learned that better results are obtained if the mandrel is of stainless steel and maintained as short as possible. Furthermore, it has been learned through experimentation that better results appear to be achieved if the mandrel serves as a cathode electrode and the band serves as an anode electrode.

The annular weld formed will not reduce the diameter of the circumscribed tubing nor will the weld cause development of an obstruction or impediment to fluid flow within the tubing. The external surface of the welded elements in proximity to the annular weld will be a smooth transition from one diameter to another and there will not exist a discontinuity or step. Such taper or transition will eliminate or minimize trauma to a patient which might otherwise arise during use of the welded catheter and balloon as part of a medical procedure.

Referring to FIG. 5 there is shown a variant 70 of a annular sealer. A mandrel 72 extends vertically from a base 74. The upper end of the mandrel may be in the form of a truncated cone 76. End 78 of a length of tubing 80 is threaded or fitted onto truncated cone 76. Prior thereto, or subsequent thereto, a balloon 82 is threaded onto mandrel 72 until sleeve section 84 circumscribes truncated cone 76 and end 78 of the tubing. An annular wedge 86 complementary to truncated cone 76 penetrable receives tubing 80 and is positioned on adjacent truncated cone 76 with end 78 and sleeve section 84 disposed therebetween. To accommodate free sliding movement of the annular wedge, its operative surface may be coated with a low friction material 88, such as that sold under the trademark Teflon. Upon positioning of annular wedge 86, it may exert a small compressive force to squeeze end 78 of tubing 80 with sleeve section 84 of balloon 82. A source 90 of RF energy is electrically connected to annular wedge 86 via an electrical conductor 92. Mandrel 72 is of electrically conductive material and may be grounded, as illustrated. In this manner, the annular wedge serves in the manner of an anod electrode and the mandrel serves in the manner of a cathode electrode.

In operation, a pulse of RF energy is radiated between the annular wedge and the mandrel upon energization of source 90. The power level and duration of the radiation through the end of the tubing and the sleeve section of the balloon must be carefully controlled by circuitry forming a part of the source of RF energy to permit slight melting. Such melting, in combination with a slight compressive force exerted by the annular wedge to retain the tubing and sleeve section adjacent, will cause welding of the two materials with one another. The width of the resulting weld is, of course, a function of the width and configuration of the annular wedge adjacent the end of the tubing and sleeve section of the balloon. Depending upon the nature of the weldable plastic material of the two components to be welded, greater or lesser or no pressure may produce the weld of desired strength and integrity. And, the source of RF energy may be of the type described in one or another of the above identified patents assigned to the present assignee.

Referring to FIG. 6, there is illustrated a further variant 100 for developing an annular weld between a length of tubing and the sleeve section of a balloon or further length of tubing. A mandrel 102 extends upwardly from a base 104 to support in threaded engagement a balloon 106. As illustrated, the balloon may be wadded or otherwise compressed accordion fashion to minimize the length of the mandrel necessary. End 108 of a length of tubing 110 is threaded onto the mandrel. Sleeve section 112 of the balloon is threaded onto end 108 of the tubing in overlapping concentric arrangement therewith. In the embodiment illustrated, a plate 114 having an aperture 116 disposed therein, which aperature includes a downwardly extending cone shaped depression 118, penetrably receives the mandrel loaded with the tubing and balloon. An elastomeric sleeve 120 is positioned about tubing 110 adjacent upper surface 122 of plate 114 An annular platen 124, or the like, receives tubing 110 and bears against the upper end of sleeve 120. Upon exertion of downward pressure upon platen 124, as depicted by arrows 126, the elastomeric sleeve will be squeezed between the platen and plate 114. Such squeezing will tend to cause the sleeve to bulge radially inwardly to exert a centripetal pressure upon the tubing and a balloon sleeve section mounted upon the mandrel. To further direct the radial bulging of the sleeve, an annular anode electrode 128 may be positioned to circumscribingly engage the sleeve and prevent radial outward bulging of the sleeve. A groove 130 may be formed in the periphery of the sleeve to receive and retain the annular anode electrode, as illustrated. A source 132 of RF energy is electrically connected to anode electrode 128 via an electrical conductor 134. As illustrated, mandrel 102 serves in the manner of a cathode electrode.

In operation, platen 124 is forced downwardly to a limited degree by a force represented by arrows 126. This downward force will be translated to a centripetal force acting upon the concentric adjacent sleeve section and tubing end as represented by arrows 136. Accordingly, the sleeve section of the balloon will be in compressive engagement with the end of the tubing. Upon energization of source 132, a pulse of RF energy is transmited to annular anode electrode 128 via conductor 134. The resulting radiation between the annular anode electrode and cathode electrode (mandrel 102) will result in heating of the balloon sleeve section and the tubing eng. By careful control of the power level and duration of the pulse transmitted by the source of RF energy, melting sufficient to form a weld can be effected. Such melting, in combination with the pressure exerted by sleeve 120, will develop a weld commensurate with the degree of overlap and the configuration of the sleeve. Under certain circumstances, it has been learned that it is sufficient to use a sleeve simply to maintain the balloon sleeve section and tubing end adjacent one another without any significant pressure therebetween. Upon completion of the weld, the platen, sleeve with attached anode and the mandrel are withdrawn leaving the balloon welded to the tubing. Source 132 of RF energy may be of the type described in one of the above identified patents assigned to the present assignee.

Figure 7:
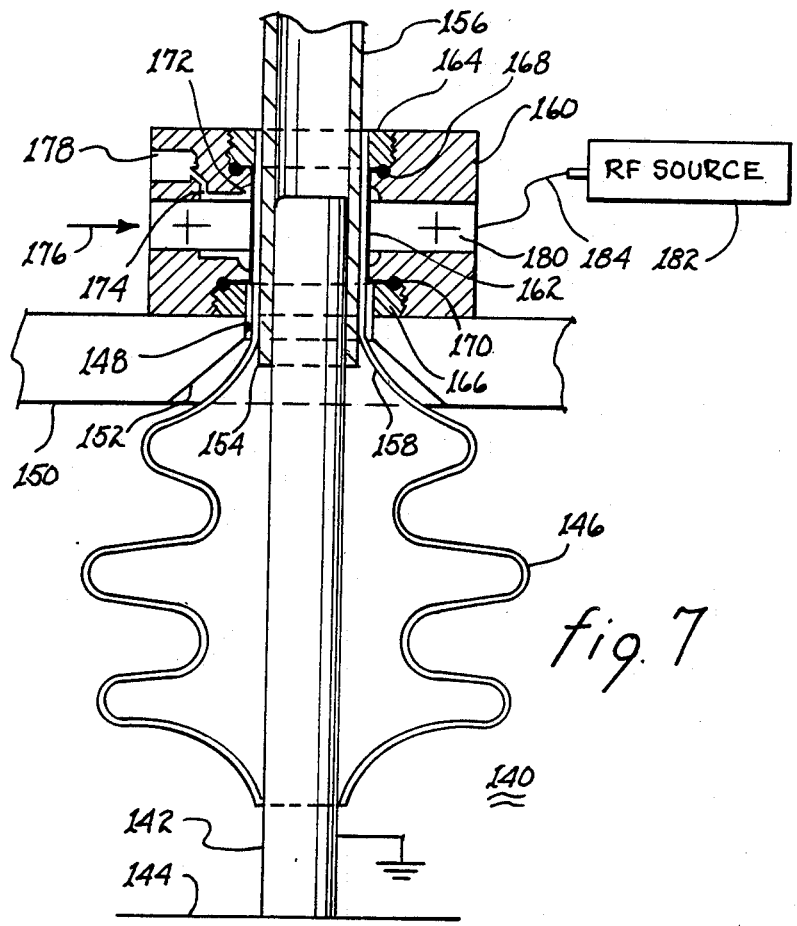
FIG. 7 illustrates a third variant of the sealer.

Referring to FIG. 7, there is illustrated a variant 140 for developing an annular weld between a length of tubing and the end of a balloon. A mandrel 142 extends upwardly from a base 144 to support a balloon 146 thereupon; the balloon may be wadded accordion fashion to accommodate the length of the balloon upon a relatively short mandrel, as illustrated. The mandrel extends through an aperture 148 disposed in a plate 150, which aperture includes a downwardly expanding cone shaped depression 152. End 154 of a length of tubing 156 is threaded onto the upper end of mandrel 142. Sleeve section 158 of balloon 146 is threaded onto end 154 in concentric circumscribing relationship therewith. A centrally apperttured dielectric housing 160 receives the end of mandrel 146 loaded with the tubing end and the balloon sleeve section. In elastomeric sleeve 162 is disposed within the aperture of housing 160 and retained in place therewithin by a pair of threaded rings 164, 166. The upper and lower ends of the sleeve may include compressible ridges 168, 170 to establish a seal between the respective ring and the housing. An annular cavity 172 is formed within housing 160. The annular cavity includes a passageway 174 in fluid communication with a source of air under pressure, as depicted by arrow 176. An appropriate fitting for engagement with an airhose or the like may be secured to expanded section 178 of passageway 174. An annular anode electrode 180 is disposed within housing 160 in circumscribing relationship with mandrel 142 and radially outwardly of sleeve 162. A source 182 of RF energy is electrically connected to annular anode electrode 180 via conductor 184.

In operation, the diameter of mandrel 142 is sized to freely receive and support end 154 of tubing 156 and sleeve section 15B of balloon 146. Similarly, housing 160 should be a slip fit upon the loaded end of the mandrel to permit ready insertion of tubing 156 and sleeve section 158 therewithin. Upon pressurization of annular cavity 172 through communication with source 176 of air pressure, sleeve 162 will be forced radially inwardly to exert a compressive force upon sleeve section 158 and bias it against concentrically engaged end 154 of tubing 156. Simultaneously therewith or subsequent thereto, source 182 of RF energy is energized. The resulting radiation of RF energy between annular anode electrode 180 and mandrel 142, serving as the cathode electrode, will heat the sleeve section and the tubing disposed there between. By careful and meticulous control of the power level and duration of the RF pulse transmitted, melting will occur to a degree sufficient to develop an annular weld between the sleeve section and the circumscribed tubing. The width of the weld is a function of the extent of overlap and the configuration and positioning of the annular anode electrode with respect to the overlapped segments. After the weld has cooled, housing 160 and the associated components are withdrawn from about tubing 156 and the mandrel is withdrawn from the balloon to release the tubing and attached balloon.

Through experimentation it has been learned that several lengths of tubing may be placed adjacent one another within and extending through the sleeve section of a balloon. Necessarily, the mandrel or other electrode disposed within the sleeve section of the balloon must be configured to accommodate the multiple tubings. Upon application of RF energy, as described above, the sleeve section will become fused or welded about the multiple lengths of tubing and the lengths of tubing will become fused or welded with one another. A balloon with multiple lengths of tubing associated therewith has utility in conjunction with various medical and clinical procedures.

Figure 8:
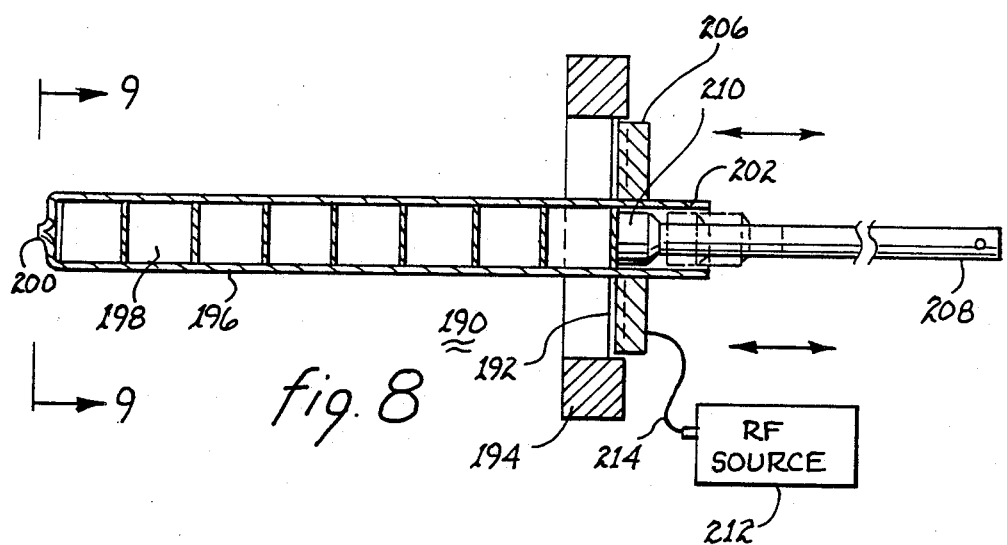
FIG. 8 illustrates the present invention for use in encapsulating items within a length of tubing.

Referring to FIG. 8, there is shown an encapsulating mechanism 190 for encapsulating within a length of tubing pelletized material or a liquid. The encapsulating mechanism includes an iris diaphragm 192 operatively supported in a holder 194, as also illustrated in FIG. 9. Such an iris diaphragm and holder is readily commercially available. It may be likened to the type of diaphragm found in many cameras for controlling the aperture of the lens. As a function of the rotational position of the holder, the aperture defined by the iris diaphram may be constricted or opened up. A length of plastic tubing 196 filled with pellets 198, other materials or a liquid, includes a closed end 200 and an open end 202. The open end of the tubing is inserted through aperture 204 of iris diaphram 192. Adjacent the iris diaphram is an annular anode electrode 206 which is centrally apertured to permit passage therethrough of tubing 196. A retractable cathode electrode 208 includes an annularly expanded end 210 for insertion within open end 202 of tubing 196. A source 212 of RF energy is electrically connected to annular anode electrode 206 via electrical conductor 214.

In operation, upon actuation of source 212 of RF energy, RF energy will radiate from annular anode electrode 206 to end 210 of cathode electrode 208 through tubing 196 disposed therebetween. This radiation will heat and somewhat soften or melt the tubing. Simultaneous therewith, iris diaphram 192 is caused to be closed, which closing will reduce the size of opening 204. The closing of opening 204 will bear upon open end 202 of tubing 196 to constrict the tubing which constriction is accommodated by the softening and melting of the tubing due to the RF radiation passing therethrough. The extent of constriction of the iris diaphram is a function of the thickness of the tubing extending through the iris diaphram and a further function of the amount of tubing material remaining after the stretching of the tubing about the pellets has occurred due to the constriction imposed by the iris diaphram.

After closing of the iris diaphram to a predetermined 1 opening, radiation of RF energy is terminated to prevent further heating and melting of the tubing. Thereafter, the tubing will begin to cool. After sufficient cooling and solidification of the tubing, end 202 will be sealed adjacent encapsulated pellets as depicted in FIG. 10. The encapsulated pellets, or other encapsulated material or fluid, can be severed from the remaining length of tubing by cutting along line 216 with a knife or tool 218. The resulting sealed end of tubing 196 will include no more than a slight nub 200, as depicted in FIG. 11.

Depending upon several factors, cathode electrode 208 may be withdrawn commensurate with the imposition of the RF radiation to permit accommodation of the closing of the iris diaphram and the resulting capture of the pellets within the tubing. Moreover, since the tubing being heated is primarily that intermediate the anode and cathode electrodes, retraction of the cathode electrode will tend to permit control of the segment of tubing being heated to more precisely control the seal being formed by the welding of the drawn together tubing.

Referring to FIG. 12, there is illustrated a variant 230 of encapsulating mechanism 190 shown primarily in FIG. 8. A housing 232 includes an aperture 234 for receiving tubing 196 containing pellets 198, other material or a fluid. A retractable electrode 236 includes an annularly expanded end 238 which is generally commensurate in diameter with the interior diameter of the tubing. Housing 232 includes a cavity having a cylindrical portion 240 and a cone shaped portion 242. A plunger 244 is slidably positionable within cylindrical portion 240. The plunger is operatively associated with a ferrule 246 of elastomeric material or other conformable material. The ferrule includes cone shaped tapered end 248 and an internal cavity 250. Upon forcing ferrule 246 toward cone shaped portion 242 through urging of plunger 244, cone shaped end 248 will be compressed and aperture 252 will be reduced in size. The rate of size reduction is a function of the translational speed of plunger 244 as well as the slope the cone shaped portion 242 and commensurate configuration of the cone shaped end. A source 254 of RF energy is electrically connected to housing 232 via conductor 256.

In operation, tubing 196 to be sealed is inserted within aperture 234 and annular expanded end 238 of electrode 236 is inserted within the tubing adjacent the pellet or other material to be encapsulated. Upon actuation of source 254, RF energy will be radiated between from aperture 234 of housing 232 and annularly expanded end 238 of electrode 236. The radiated energy will heat the segment of tubing 196 disposed therebetween. Such heating will cause a softening and subsequent melting of the tubing. Subsequently or simultaneously therewith, electrode 236 is retracted, as indicated by the dashed lines depicting annularly expanded end 238. Upon retraction of the annularly expanded end past aperture 252 defined by ferrule 246, plunger 244 is translatably repositioned toward the ferrule to urge the ferrule into operative engagement with cone shaped portion 242. Cone shaped end 248 of the ferrule, due to engagement with cone shaped portion 242, will tend to constrict aperture 252. Such constriction will act upon and close the open end of tubing 196, which closure is accommodated by the previously and/or ongoing melting, or at least softening of a part of the tubing. The eng of tubing will become sealed through the constriction and the squeezing of the melted or softened part of the tubing wedged by cone shaped end 248 of the ferrule. After of source 254 of RF energy is deenergized and subsequent cooling of the melted tubing, plunger 244 is withdrawn to permit translation of ferrule 246 and resumed expansion of cone shaped end 248. Such expansion will also release tubing 196 and permit its withdrawal from variant 230. Thereafter, the closed end of the tubing may be trimmed as depicted and described above with respect to FIGS. 10 and 11.

While technical analysis of the RF radiation field attendant melting of the tubing in the encapsulating mechanism illustrated in FIGS. 8 and 12 would suggest that polarity of the respective electrodes have no effect upon the radiation field created, better results appear to be achieved if the housing is treated as a cathode electrode and the retractable electrode is treated as an anode electrode. The reasons for these results are inexplicable at the present time.

Developmental work attendant the annular RF welding described herein suggests and provides evidence for the capability of welding two materials of which only one may be responsive to dielectric welding. When such materials are juxtaposed and irradiated with RF energy, the dielectric responsive material will heat and experience a rise in temperature It is believed that by conduction of heat from the material responsive to dielectric welding to the non-dielectric welding responsive material, the latter will experience a rise in temperature. The temperature increase will, at some point depending on the characteristics of the material, result in at least some melting of the non-dielectric welding responsive material. With concurrent melting of the dielectric welding responsive material, the two materials will become fused with one another and be welded to one another after irradiation ceases and the materials cool. Thus, non-dielectric welding responsive materials, such as polyethylene, can be welded to dielectric welding responsive materials through use of the invention described herein.

While the principles of the invention have now been made clear in the illustrated embodiments, there will be immediately obvious to those skilled in the art, many modifications of structures, arrangements, proportions, elements, materials and components used in the practice of the invention and otherwise, which are particularly adapted for specific environments and operational requirements without departing from those principles. The appended claims are therefore intended to cover and embrace any such modifications within the limits only of the true spirit and scope of the invention.

I claim:

1. A method of sealing with RF energy a length of tubing; said method comprising the steps of:
    (a) locating a first electrode within the length of tubing;
    (b) circumstribing the length of tubing with a second electrode;
    (c) radially compressing the length of tubing to effect a closure of the tubing; and
    (d) radiating RF energy between the first and second electrodes to heat the tubing; accommodate compression of the tubing and seal the closure.

2. A method as claimed in claim 1 including the step of repositioning the first electrode during exercise of said step of radiating.

3. A method as claimed in claim 1 including the step of retaining in place the uncompressed length of tubing.

4. A method as claimed in claim 1 including the step of trimming the sealed closure.

5. A method as claimed in claim 1 wherein said step of compressing includes the step of compressing the tubing with an iris diaphragm.

6. A method as claimed in claim 1 wherein said step of compressing includes the step of compressing the tubing with a plurality of radially movable jaws.

7. An annular sealer for welding concentric overlaped heat fusible elements to one antoher, said sealer comprising in combination:
    (a) a mandrel for supporting in inscribed relationship the concentric overlapped heat fusible elements;
    (b) band means for circumscribing the overlapped heat fusible elements and for urging them against said mandrel to retain them in contacting relationship with one another;
    (c) means for heating the overlapped heat fusible elements along an annular area to form an annular weld between the overlapped heat fusible elements, said heating means including further band means for generally annularly engaging in circumscribed relationship the overlapped heat fusible elements and means for wrapping said band means and said further band means about the overlapped heat fusible elements.

8. An annular sealer as claimed in claim 7 wherein said band means and said further band means are juxtaposed with one another.

9. An annular sealer as claimed in claim 7 wherein said band means and said further band means are attached to one another.

10. An annular sealer as claimed in claim 9 wherein said further band means is of a first width and said band means is of a second width greater than the first width whereby said band means extends laterally in both directions from said further band means.

11. An annular sealer as claimed in claim 7 wherein said heating means includes a source of RF energy and means for electrically interconnecting said mandrel and said engaging means with said source of RF energy.

12. A method of annularly welding concentric overlapped heat fusible elements to one another, said method comprising the steps of:
    (a) supporting upon a mandrel in inscribed relationship the concentric overlapped heat fusible elements;
    (b) circumscribing and urging the overlapped heat fusible elements against the mandrel to retain them in contacting relationship with one another;
    (c) heating the overlapped heat fusible elements along an annular area to form an annular weld between the overlapped fusible elements with an annular band; and
    (d) wrapping the band about the overlapped heat fusible elements prior to exercise of said step of heating.

13. A method as claimed in claim 12 including a sources of RF energy for carrying out said step of heating and including the step of electrically interconnecting the band and the mandrel with the source of RF energy.

* * * * *